(12) United States Patent
Baba et al.

(10) Patent No.: US 11,165,279 B2
(45) Date of Patent: Nov. 2, 2021

(54) POWER SUPPLY APPARATUS, CONTROL APPARATUS FOR POWER SUPPLY APPARATUS, AND METHOD FOR CONTROLLING POWER SUPPLY APPARATUS

(71) Applicant: KYOCERA Corporation, Kyoto (JP)

(72) Inventors: Masahiro Baba, Kawasaki (JP); Shusuke Nakayama, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/959,433

(22) PCT Filed: Jan. 23, 2019

(86) PCT No.: PCT/JP2019/002121
§ 371 (c)(1),
(2) Date: Jul. 1, 2020

(87) PCT Pub. No.: WO2019/146655
PCT Pub. Date: Aug. 1, 2019

(65) Prior Publication Data
US 2020/0373782 A1    Nov. 26, 2020

(30) Foreign Application Priority Data
Jan. 29, 2018    (JP) .............................. JP2018-012875

(51) Int. Cl.
*H02J 13/00* (2006.01)
*H02J 3/32* (2006.01)

(52) U.S. Cl.
CPC .. *H02J 13/00032* (2020.01); *H02J 13/00016* (2020.01); *H02J 3/32* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 9,483,093 B2 | 11/2016 | Okamoto et al. | |
| 2011/0047398 A1* | 2/2011 | Koizumi | H04L 12/10 713/330 |
| 2015/0058642 A1 | 2/2015 | Okamoto et al. | |

FOREIGN PATENT DOCUMENTS

| | | |
|---|---|---|
| JP | 2001168890 A | 6/2001 |
| JP | 2015162932 A | 9/2015 |
| WO | 2013168289 A1 | 11/2013 |

* cited by examiner

*Primary Examiner* — Hal Kaplan
*Assistant Examiner* — Thai H Tran
(74) *Attorney, Agent, or Firm* — Hauptman Ham, LLP (57) ABSTRACT

A power supply apparatus is connectable to a common communication line together with at least one other apparatus. The power supply apparatus includes a communication interface and a controller. The communication interface is configured to transmit a signal indicating the presence of the power supply apparatus to a first apparatus connected to the power supply apparatus among the at least one other apparatus and to receive a signal indicating the presence of a second apparatus from the second apparatus connected to the power supply apparatus among the at least one other apparatus. The controller is configured to determine whether the power supply apparatus is connected to an end portion of the common communication line, based on whether the communication interface has received the signal indicating the presence of the second apparatus.

11 Claims, 7 Drawing Sheets

(52) U.S. Cl.
CPC ........... *H02J 2300/20* (2020.01); *Y02E 40/70* (2013.01); *Y02E 60/00* (2013.01); *Y04S 10/123* (2013.01); *Y04S 10/14* (2013.01); *Y04S 40/124* (2013.01)

POWER SUPPLY APPARATUS, CONTROL APPARATUS FOR POWER SUPPLY APPARATUS, AND METHOD FOR CONTROLLING POWER SUPPLY APPARATUS

CROSS REFERENCE TO RELATED APPLICATION

This application is a national phase of International application No. PCT/JP2019/002121, filed Jan. 23, 2019 which claims priority to and the benefit of Japanese Patent Application No. 2018-12875 filed on Jan. 29, 2018.

TECHNICAL FIELD

The present disclosure relates to a power supply apparatus, a control apparatus for a power supply apparatus, and a method for controlling the power supply apparatus.

BACKGROUND

Conventionally, techniques for controlling a plurality of power supply apparatuses are known. For example, there is a method for controlling to store electric power in, or discharge stored power from, a power storage apparatus that includes a plurality of power supply modules.

SUMMARY

A power supply apparatus according to an embodiment of the present disclosure can be connected to a common communication line together with at least one other apparatus. The power supply apparatus includes a communication interface and a controller. The communication interface is configured to transmit a signal indicating the presence of the power supply apparatus to a first apparatus connected to the power supply apparatus, among the at least one other apparatus, and to receive a signal indicating the presence of a second apparatus from the second apparatus connected to the power supply apparatus, among the at least one other apparatus. The controller is configured to determine whether the power supply apparatus is connected to an end portion of the common communication line, based on whether the communication interface has received the signal indicating the presence of the second apparatus.

A control apparatus according to an embodiment of the present disclosure is configured to control a power supply apparatus that can be connected to a common communication line together with at least one other apparatus. The control apparatus is configured to cause the power supply apparatus to transmit a signal indicating the presence of the power supply apparatus to a first apparatus connected to the power supply apparatus, among the at least one other apparatus, and to receive a signal indicating the presence of a second apparatus from the second apparatus connected to the power supply apparatus, among the at least one other apparatus. The control apparatus is configured to determine whether the power supply apparatus is connected to an end portion of the common communication line, based on whether the power supply apparatus has received the signal indicating the presence of the second apparatus.

A control method according to an embodiment of the present disclosure is a method for controlling a power supply apparatus that can be connected to a common communication line together with at least one other apparatus. The method includes transmitting a signal indicating the presence of the power supply apparatus to a first apparatus connected to the power supply apparatus, among the at least one other apparatus. The method includes receiving a signal indicating the presence of a second apparatus from the second apparatus connected to the power supply apparatus, among the at least one other apparatus. The method includes determining whether the power supply apparatus is connected to an end portion of the common communication line, based on whether the signal indicating the presence of the second apparatus has been received.

DETAILED DESCRIPTION

The usability of a technique for controlling a plurality of power supply apparatuses is desired to improve. The present disclosure relates to providing a power supply apparatus that improves the usability of the technique for controlling a plurality of power supply apparatuses connected to a common communication line, a control apparatus for the power supply apparatus, and a method for controlling the power supply apparatus. According to the present disclosure, the usability of the technique for controlling a plurality of power supply apparatuses connected to a common communication line is improved. Hereinafter, embodiments of the present disclosure will be described with reference to the drawings. In the present embodiment, a power storage apparatus is described as an example of the power supply apparatus. The power storage apparatus can store, for example, electric power supplied from an apparatus external to the power storage apparatus. The power storage apparatus can supply stored electric power to an external apparatus. The power supply apparatus is not limited to the power storage apparatus. The power supply apparatus simply needs to be able to supply electric power to an external device and may be a power supply apparatus such as, for example, a solar cell, a wind power generation apparatus, a hydraulic power generation apparatus, a fuel cell, or the like.

Figure 1:
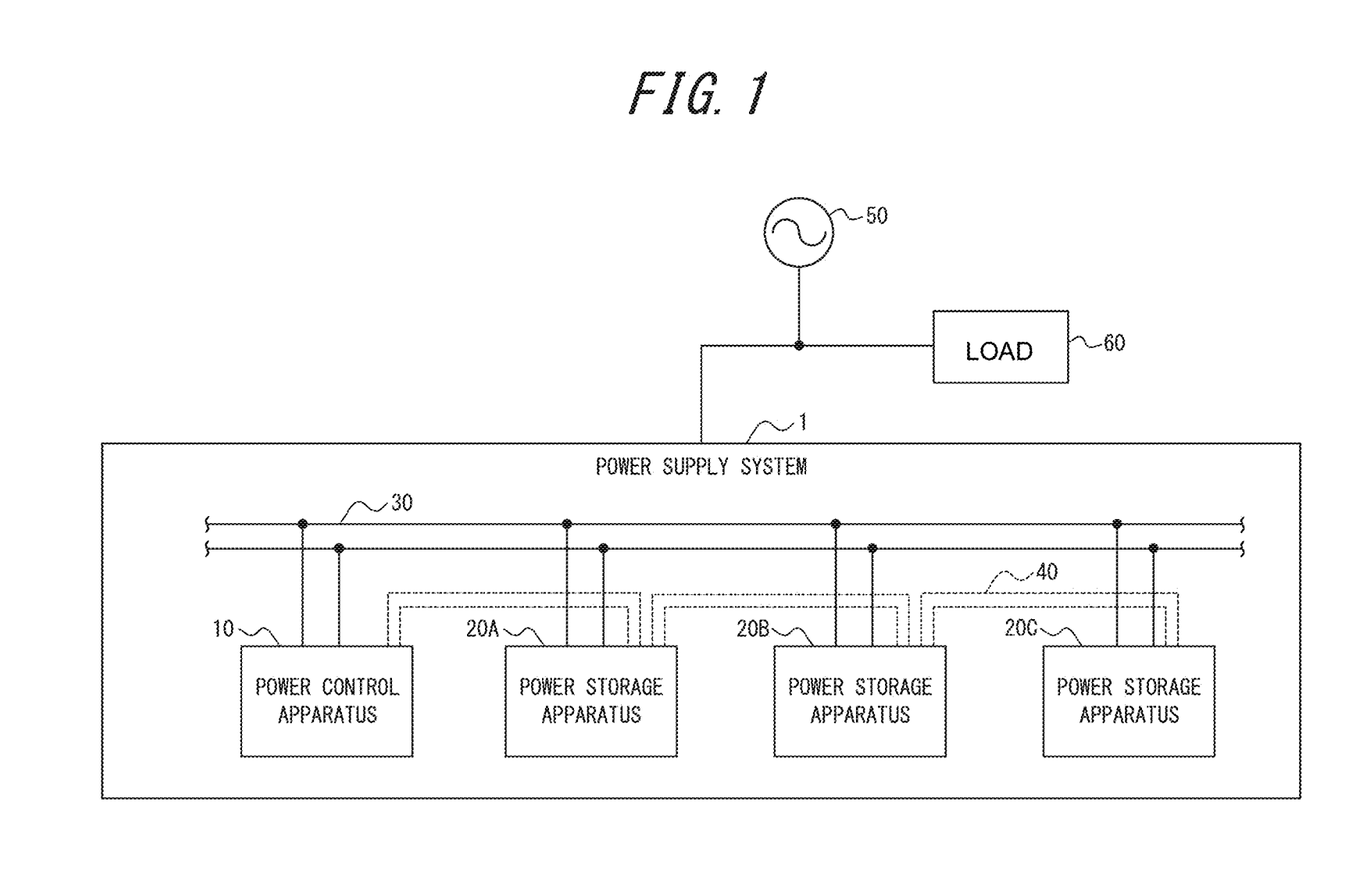
FIG. 1 is a schematic configuration diagram of a power supply system according to an embodiment of the present disclosure.

FIG. 1 is a schematic configuration diagram illustrating an example of a power supply system 1 according to an embodiment of the present disclosure. The power supply system 1 includes apparatuses such as a power control apparatus 10 and power storage apparatuses 20A, 20B, and 20C. The power supply system 1 is connected to a power grid 50 and supplies electric power to a load 60 and the like connected to the power grid 50. The power supply system 1 may supply sellable power to the power grid 50. The load 60 is, for example, any electric apparatus that consumes electric power. Hereinafter, the power storage apparatuses 20A, 20B, and 20C will be collectively referred to as a power storage apparatus 20 when they are not distinguished from each other. Note that a power line for supplying electric power from each of the power control apparatus 10 and the power storage apparatus 20 is omitted in FIG. 1.

In the power supply system 1, the apparatuses such as the power control apparatus 10 and the power storage apparatus 20 included in the power supply system 1 are connected to a common communication line 30 that can connect a plurality of apparatuses. The common communication line 30 can be made, for example, in a bus topology. Each of the apparatuses included in the power supply system 1 is connected to each node on the common communication line 30. Each node is indicated by a black dot in FIG. 1. In the present specification, each of the nodes located furthest from each other on the common communication line 30 among the nodes provided to the common communication line 30 will be referred to as an end portion of the common communication line 30. In FIG. 1, among the apparatuses included in the power supply system 1, the power control apparatus 10 and the power storage apparatus 20C are connected to the respective end portions of the common communication line 30. Further, the apparatuses included in the power supply system 1 are connected in a one-to-one manner via a communication line 40 to other apparatuses that are connected to adjacent nodes on the common communication line 30. In FIG. 1, the power storage apparatus 20A is connected to each of the power control apparatus 10 and the power storage apparatus 20B that are connected to the adjacent nodes, via the respective communication lines 40. In FIG. 1, thus, the apparatuses included in the power supply system 1, that is, the power control apparatus 10 and the power storage apparatuses 20A, 20B, and 20C are sequentially connected in series via three communication lines 40. The common communication line 30 and the communication lines 40 may include a plurality of communication lines having different signal transmission directions. A plurality of communication lines may be combined to form one cable in a manner similar to a LAN cable. The power control apparatus 10 and the power storage apparatus 20 communicate with each other via the common communication line 30 or the communication line 40, depending on the purposes. Although FIG. 1 illustrates an example in which the power supply system 1 includes one power control apparatus 10 and three power storage apparatuses 20A, 20B, and 20C, the power supply system 1 may have any configuration and include any number of apparatuses. For example, the power storage apparatus 20 may be added or removed in accordance with the storage capacity required for the power supply system 1. Each of the common communication line 30 and the communication lines 40 may be a wired line or a wireless line.

The power control apparatus 10 is also referred to as PCS (Power Conditioning System). The power control apparatus 10 is configured to control output electric power to, for example, the load 60 from the power storage apparatus 20, or to convert DC power output from the power storage apparatus 20 into AC power and output the AC power to the load 60.

The power storage apparatus 20 supplies electric power to the load 60 or the like connected to the power grid 50. The power storage apparatus 20 may supply sellable power to the power grid 50. Also, the power storage apparatus 20 stores electric power supplied from the power grid 50. The power storage apparatus 20 may operate to supply electric power, store electric power, or provide information regarding the power storage apparatus 20, based on a control signal received from the power control apparatus 10.

Figure 2:
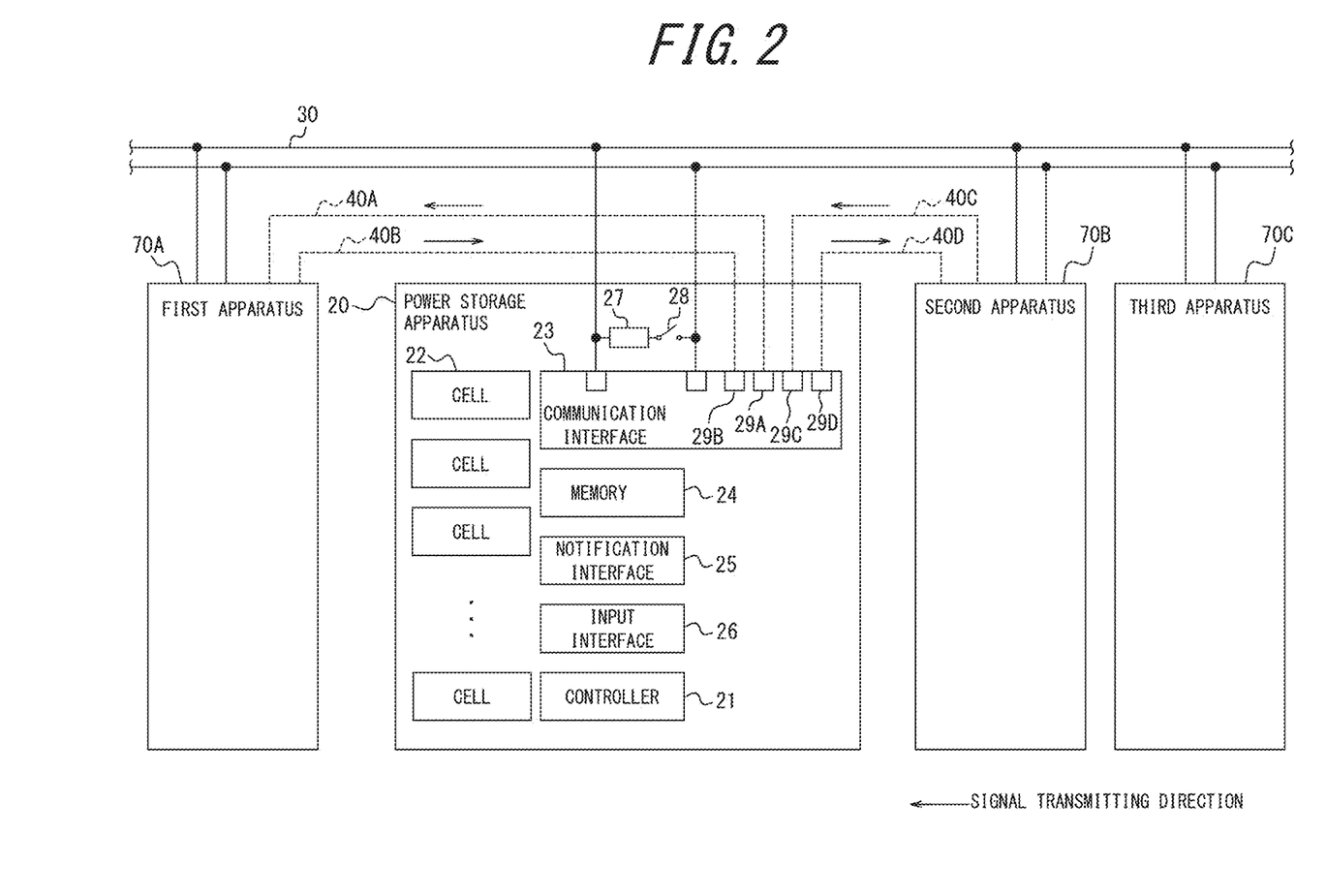
FIG. 2 is a functional block diagram illustrating a power supply apparatus according to an embodiment of the present disclosure.

FIG. 2 illustrates a schematic configuration of the power storage apparatus 20 as an example of the power supply apparatus according to an embodiment of the present disclosure. The power storage apparatus 20 includes a controller 21, cells 22, a communication interface 23, a memory 24, a notification interface 25, an input interface 26, a terminating resistor 27, and a switch 28.

As will be described in detail later, the controller 21 is one or more processors that provide control and management ability to achieve each function of the power storage apparatus 20. The controller 21 may be a processor such as a CPU (Central Processing Unit) configured to perform a program defining a control procedure, or a specialized processor dedicated for processing of each function.

The controller 21 is connected to the cells 22, the communication interface 23, the memory 24, the notification interface 25, the input interface 26, the terminating resistor 27, and the switch 28, and configured to control and manage the power storage apparatus 20 in its entirety or partially, including the functional units mentioned above. The controller 21 is configured to acquire a program stored in the memory 24 and execute the program, and thus realize various functions associated with the functional units of the power storage apparatus 20. When the controller 21 transmits a control signal or various information to another functional unit, the controller 21 and the another functional unit may be connected to each other in a wired or wireless manner. Characteristic control performed by the controller 21 in the present embodiment will be further described later. In the present embodiment, the controller 21 may have a function to measure a predetermined time period, such as a time elapsed since activation of the power storage apparatus 20.

The cells 22 charge or discharge electric power, based on control by the controller 21. The power storage apparatus 20 may include a plurality of cells 22. The cells 22 may be controlled and managed by the controller 21 as a modular unit in which a plurality of cells 22 are connected.

The communication interface 23 communicates with another apparatus, based on control by the controller 21. For example, the communication interface 23 is connected to the common communication line 30, together with a first apparatus 70A, a second apparatus 70B, and a third apparatus 70C. Hereinafter, the first apparatus 70A, the second apparatus 70B, and the third apparatus 70C will be collectively referred to as another apparatus (other apparatuses) 70 when they are not distinguished from each other. The communication interface 23 receives a signal from another apparatus 70 or transmits a signal to another apparatus 70, via the common communication line 30. Another apparatus 70 connected to the common communication line 30 may include, for example, the power control apparatus 10, the power storage apparatus 20, another power supply apparatus, or the like. In this way, the power storage apparatus 20 can, for example, receive a control signal from another apparatus 70 and operate based on the control signal. Further, the power storage apparatus 20 can transmit a signal that includes information regarding a charged capacity, a failure status, or the like of the power storage apparatus 20 to another apparatus 70.

Further, the terminating resistor 27 and the switch 28 may be connected to the common communication line 30. When the controller 21 controls the switch 28, the terminating resistor 27 is connected to, or disconnected from, the common communication line 30. The terminating resistor 27 is connected to the common communication line 30 when the power storage apparatus 20 is located at an end portion of the common communication line 30. Thus, unnecessary reflection of a signal at the end portion of the common communication line 30 can be suppressed, and quality of a signal transmitted via the common communication line 30 is improved.

The communication interface 23 is directly connected to the first apparatus 70A and the second apparatus 70B, among other apparatuses 70, via the communication lines 40A, 40B, 40C, or 40D. Hereinafter, the communication lines 40A, 40B, 40C, and 40D will be collectively referred to as a communication line 40 when they are not distinguished from each other. In this way, the power storage apparatus 20 and another apparatus 70 connected to the common communication line 30 are connected in series via the communication lines 40. The communication interface 23 receives signals from the first apparatus 70A and the second apparatus 70B via the communication line 40 and transmits signals to them. Thus, the power storage apparatus 20 can communicate with the first apparatus 70A and the second apparatus 70B in a preparation stage preparing for the use of the common communication line 30 described above. The preparation stage preparing for the use of the common communication line 30 includes, for example, a condition in which the terminating resistor 27 is not connected to an end portion of the common communication line 30 described above, or a condition in which the common communication line 30 is not provided with an identifier as information used to uniquely identify the power storage apparatus 20. Hereinafter, the identifier will be referred to as ID.

The communication line 40 may include communication lines with different signal transmitting directions, as indicated by arrows illustrated in FIG. 2. For example, the communication line 40 connecting the communication interface 23 and the first apparatus 70A may include a communication line 40A for transmitting a signal to the first apparatus 70A from the communication interface 23 and a communication line 40B for transmitting a signal to the communication interface 23 from the first apparatus 70A. Similarly, the communication line 40 connecting the communication interface 23 and the second apparatus 70B may further include a communication line 40C for transmitting a signal to the communication interface 23 from the second apparatus 70B and a communication line 40D for transmitting a signal to the second apparatus 70B from the communication interface 23. Further, for example, the communication line 40 may include different communication lines for each signal, including a presence signal or an ID signal, which will be described later.

The communication interface 23 may include terminals 29A, 29B, 29C, and 29D respectively serving as an input terminal or an output terminal to be connected to the common communication line 30 and the communication lines included in the communication line 40 described above. Hereinafter, the terminals 29A to 29D will be collectively referred to as a terminal 29 when they are not distinguished from each other. The terminal 29 may be an input-output terminal that includes a pull-up resistor or a pull-down resistor. In this way, the terminal 29 can function as an input terminal or an output terminal, based on control by the controller 21. For example, the terminals 29B and 29C respectively connected to the communication lines 40B and 40C such that the communication interface 23 can receive a signal from the first apparatus 70A or the second apparatus 70B may be terminals for input to be caused to function as input terminals, as described above. Further, the terminals 29A and 29D respectively connected to the communication lines 40A and 40D such that the communication interface 23 can transmit a signal to the first apparatus 70A or the second apparatus 70B may be terminals for output to be caused to function as output terminals.

The memory 24 stores information to be used for the processing performed by the power storage apparatus 20, a program describing the contents of the processing for realizing each function of the power storage apparatus 20, and the like. The memory 24 can also function as a working memory. In the present embodiment, the memory 24 stores, for example, information to be used for the processing for setting an ID of the power storage apparatus 20, which will be described later. The memory 24 may be a cache memory or the like of the processor mentioned above included in the controller 21.

The notification interface 25 notifies information using a sound, a vibration, light, an image, or the like. The notification interface 25 includes at least one of, for example, a speaker, a vibrator, a lighting, a display device, and the like. The display device may be, for example, a liquid crystal display or an organic electroluminescence display. The notification interface 25 may inform at least one of the ID of the power storage apparatus 20, information regarding a remaining level of electric power stored in the power storage apparatus 20, and information regarding connection/disconnection of the terminating resistor 27, based on control by the controller 21. The notification interface 25 may notify information regarding at least one of a charged capacity of the power storage apparatus, a deterioration level of the power storage apparatus, and occurrence of failure to the power storage apparatus.

The input interface 26 receives an input operation from a user. The input interface 26 includes at least one of a mechanical key such as a power button, an input device such as a touch panel integrally configured with a display device of the notification interface 25, and a pointing device such as a mouse. When the input interface 26 is operated by the user, the input interface 26 transmits the user operation as electronic information to the controller 21. At least one of the notification interface 25 and the input interface 26 may be provided to, for example, a remote controller, a tablet computer, or a personal computer that is physically separated from the power storage apparatus 20.

The following is a description of control performed by the controller 21 over each function of the power storage apparatus 20. The controller 21 causes the communication interface 23 to transmit a signal indicating the presence of the power storage apparatus 20 to the first apparatus 70A connected to the power storage apparatus 20, among other apparatuses, via the communication line 40A. Also, the controller 21 causes the communication interface 23 to receive a signal indicating the presence of the second apparatus 70B from the second apparatus 70B connected to the power storage apparatus 20, among other apparatuses, via the communication line 40C. Hereinafter, a signal indicating the presence of an apparatus as described above will also be referred to as a presence signal. The presence signal may be any appropriate signal. The presence signal may include information indicating the presence of an apparatus. For example, the presence signal may be a digital signal indicated by high/low of a voltage. The presence signal may be transmitted at any appropriate timing. For example, the presence signal of the power storage apparatus 20 may be transmitted when the power storage apparatus 20 is activated, or when a user operation in respect of the input interface 26 to transmit the presence signal is detected.

The controller 21 determines whether the power storage apparatus 20 is connected to an end portion of the common communication line 30, based on whether the communication interface 23 has received a signal indicating the presence of the second apparatus 70B. In particular, when the communication interface 23 has not received the signal indicating the presence of the second apparatus 70B, the controller 21 may determine that the second apparatus 70B is not present, or that the power storage apparatus 20 is connected to an end portion of the common communication line 30. A meaning of that the power storage apparatus 20 is connected to an end portion of the common communication line 30 may include a state in which, among apparatuses connected to the common communication line 30, there is no apparatus that is located closer to an end portion than the power storage apparatus 20. When the controller 21 determines whether the power storage apparatus 20 is connected to an end portion of the common communication line 30, the controller 21 may store a determination result in the memory 24. Various methods may be employed to determine whether the signal indicating the presence of the second apparatus 70B has been received. For example, when a predetermined time period has elapsed from activation of the power storage apparatus 20 without receiving a presence signal, the controller 21 may determine that the presence signal has not been received.

When the controller 21 determines that the power storage apparatus 20 is connected to an end portion of the common communication line 30, the controller 21 connects the terminating resistor 27 to the common communication line 30. The controller 21 connects the terminating resistor 27 to the common communication line 30 by controlling the switch 28.

The controller 21 causes the communication interface 23 to receive a signal indicating an ID of the first apparatus 70A from the first apparatus 70A via the communication line 40B. The controller 21 sets an ID of the power storage apparatus 20, based on the ID of the first apparatus 70A. Further, the controller 21 causes the communication interface 23 to transmit a signal indicating the ID of the power storage apparatus 20 to the second apparatus 70B via the communication line 40D. Hereinafter, a signal including an ID of an apparatus as described above will also be referred to as an ID signal. The ID may be any information that uniquely specifies the apparatus, including the first apparatus 70A or the power storage apparatus 20, connected to the common communication line 30. The ID may be, for example, a sequential integer. The ID signal may be any signal. For example, the ID signal may be a digital signal indicated by high/low of a voltage using a plurality of signal lines. The ID signal may be an analog signal that uses amplitude modulation, frequency modulation, or phase modulation, or a pulse signal that uses PWM (Pulse Width Modulation). Upon receiving the ID signal of the first apparatus 70A, the controller 21 calculates the ID of the power storage apparatus 20, based on the ID of the first apparatus 70A included in the ID signal. For example, when the ID is a sequential integer, the controller 21 may calculate the ID of the power storage apparatus 20 by adding 1 to the ID of the first apparatus 70A. The controller 21 may store the calculated ID of the power storage apparatus 20 in the memory 24. The memory 24 may store the ID until, for example, the power of the power storage apparatus 20 is turned off, or until the power storage apparatus 20 is reactivated. When the ID of the power storage apparatus 20 is calculated, the controller 21 may cause the communication interface 23 to transmit an ID signal of the power storage apparatus 20 to the second apparatus 70B.

When the controller 21 completes the preparation for the use of the common communication line 30 including the connection of the terminating resistor 27 and the setting of the ID of the power storage apparatus 20 as described above, the controller 21 may start communication with another apparatus 70 via the common communication line 30. In the communication via the common communication line 30, the ID of each apparatus set in the above manner is used. In this way, communication specifying a sender and a destination of a signal in the communication via the common communication line 30 is realized.

The controller 21 may cause the communication interface 23 to transmit the signal indicating the presence of the power storage apparatus 20 to the second apparatus 70B via the communication line 40D. Also, the controller 21 may cause the communication interface 23 to receive a signal indicating the presence of the first apparatus 70A from the first apparatus 70A via the communication line 40B. In this way, the presence signals are transmitted in opposite directions directed to the power storage apparatus 20 from the second apparatus 70B and to the first apparatus 70A from the second apparatus 70B described above. The controller 21 may determine whether the first apparatus 70A is present or whether the power storage apparatus 20 is connected to an end portion of the common communication line 30, based on whether the communication interface 23 has received the presence signal of the first apparatus 70A. Further, when the controller 21 determines that the power storage apparatus 20 is connected to an end portion of the common communication line 30, the controller 21 connects the terminating resistor 27 to the common communication line 30. When the communication interface 23 does not receive the presence signal of the first apparatus 70A, the controller 21 sets the ID of the power storage apparatus 20 to be a predetermined value. For example, when the ID includes a sequential integer, the predetermined value may be 1. The controller 21 may store the ID of the power storage apparatus 20 in the memory 24. Various methods may be employed to determine whether the presence signal of the first apparatus 70A has been received. For example, when a predetermined time period has elapsed from activation of the power storage apparatus 20 without receiving a presence signal, the controller 21 may determine that the presence signal has not been received.

The controller 21 transmits an instruction for causing another apparatus 70 to notify at least one of information whether the power storage apparatus 20 is connected to an end portion of the common communication line and the ID of the power storage apparatus 20, via the common communication line 30. The instruction for the notification may be, for example, an instruction for causing another apparatus 70 to display at least one of the information and the ID on its display. The controller 21 may voluntarily transmit the instruction for the notification. The instruction for the notification may be transmitted in response to an external input such as a user operation or a transmission request from another apparatus 70. The instruction for the notification may include information whether another apparatus 70 is connected to an end portion of the common communication line, or information notifying the ID of the power storage apparatus 20. Upon receiving the instruction for the notification, another apparatus 70 notifies the information regarding the power storage apparatus 20, based on the instruction for the notification. For example, another apparatus 70 may determine whether each of the apparatus is provided with a different ID, based on the information received from each of the apparatus connected to the common communication line 30. Another apparatus 70 may create a network configuration diagram of the common communication line 30 that includes information such as the number of connected apparatuses, IDs of the connected apparatuses, or a location of a connected terminating resistor 27, based on the information received from each of the apparatuses connected to the common communication line 30, and display the network configuration diagram on the display.

In starting communication by the communication interface 23, the controller 21 attempts to receive signals at both the input terminal and the output terminal. For example, a case in which the user connects a cable including the communication lines 40A and 40B and a cable including the communication lines 40C and 40D to the power storage apparatus 20 and also connects the communication lines 40A to 40D respectively to the terminal 29A to 29D will be considered. In starting communication by the communication interface 23, the controller 21 causes the input terminals 29B and 29C and the output terminals 29A and 29D to function as input terminals. When the input terminal 29B or 29C receives a signal via the communication line 40B or 40C, the controller 21 may determine that the communication lines 40A to 40D are respectively connected to the terminals 29A to 29D. When the controller 21 determines that the communication lines 40A to 40D are respectively connected to the terminals 29A to 29D, the controller 21 controls the output terminals 29A and 29D to function as output terminals. On the other hand, erroneous cable wiring in which the communication line 40B or 40C is connected to the terminal 29A or 29D may occur. In this case, when the output terminal 29A or 29D receives a signal via the communication line 40B or 40C, the controller 21 may determine that there is erroneous cable wiring of the communication line 40. When the controller 21 determines that there is erroneous cable wiring, the controller 21 may cause the notification interface 25 to notify the user of the error. Alternatively, the controller 21 may control such that the output terminals 29A and 29D remain functioning as input terminals and the input terminals 29B and 29C function as output terminals.

In the present disclosure, some or all of the functions of the controller 21 described above may be provided by a control apparatus that controls the power storage apparatus 20. The control apparatus may be a battery management system (Battery Management System: BMS) for controlling and managing a plurality of power storage apparatuses 20, or a home energy management system (Home Energy Management System: HEMS). The control apparatus may be the power control apparatus 10. The control apparatus may be incorporated in the power storage apparatus 20, or separately provided as an individual apparatus external to the power storage apparatus 20.

Example Operation 1 of Power Supply System

Figure 3:
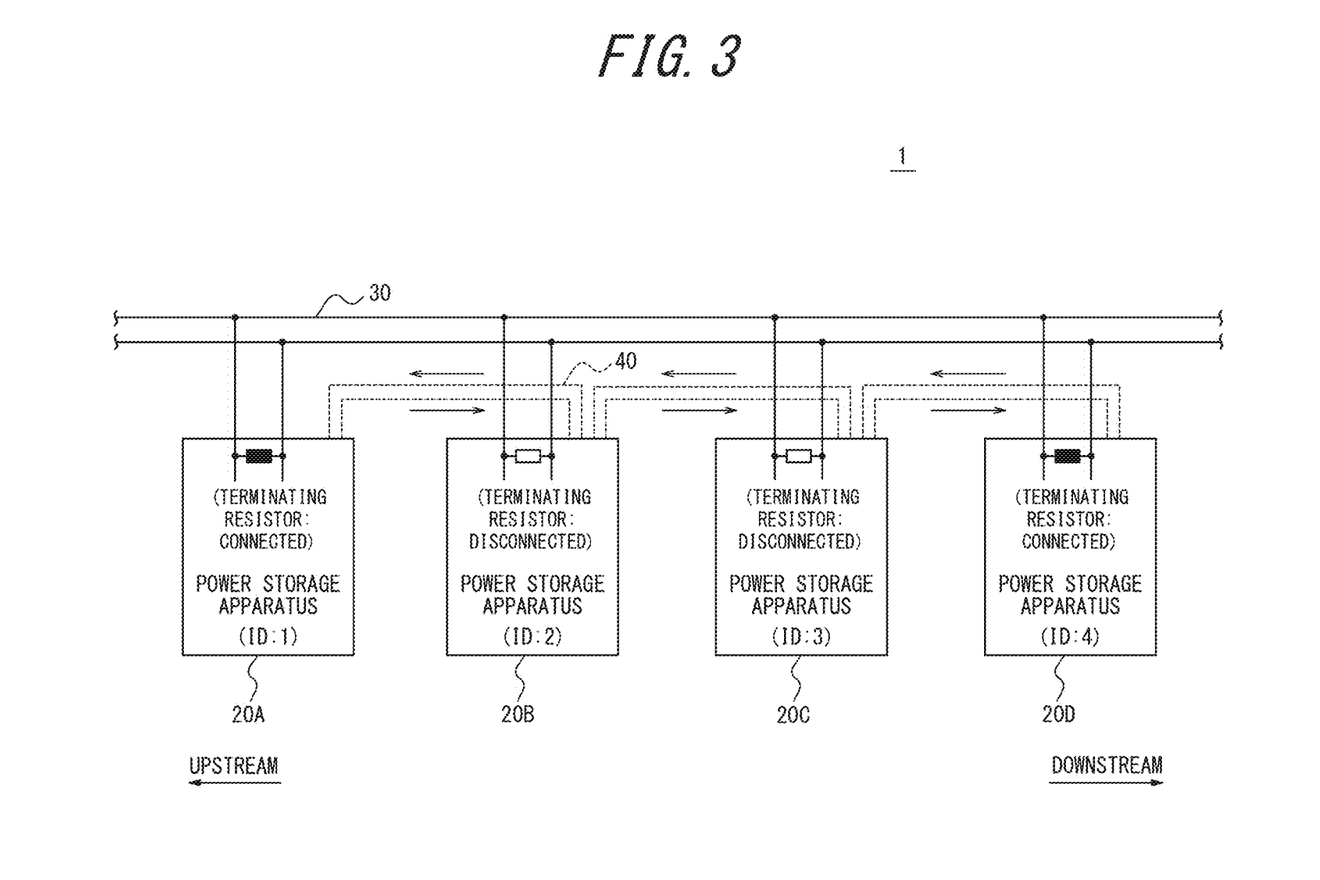
FIG. 3 is a diagram illustrating an example of an apparatus configuration of a power supply system according to an embodiment of the present disclosure.
Figure 4:
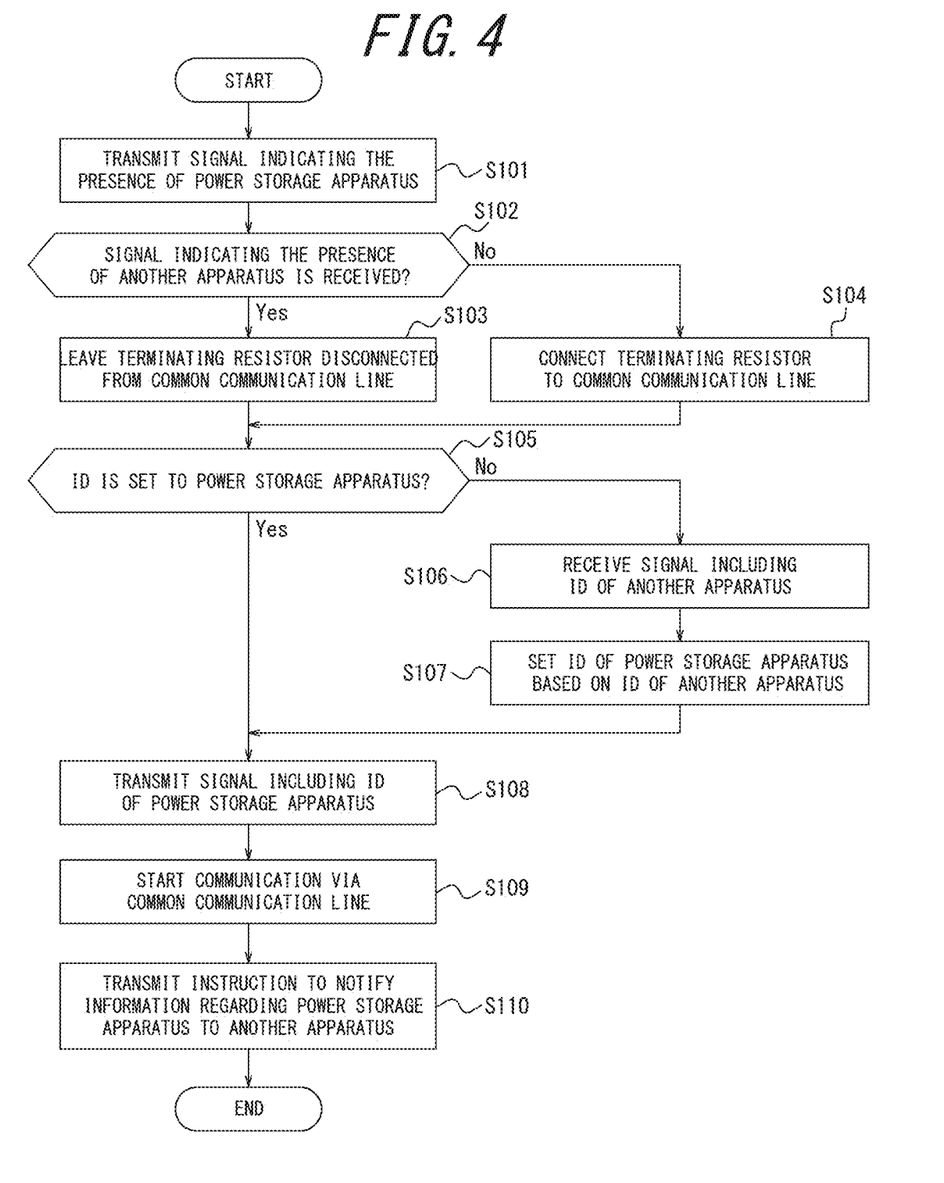
FIG. 4 is a flowchart illustrating an example processing performed by the power supply apparatus illustrated in FIG. 3.

An example of the connection of the terminating resistor and provision of an ID performed by the power supply system 1 according to an embodiment of the present disclosure will be described with reference to FIG. 3 and FIG. 4. FIG. 3 illustrates four power storage apparatuses 20A, 20B, 20C, and 20D that are included in the power supply system 1 and connected to the common communication line 30. The power storage apparatuses 20A and 20B, the power storage apparatuses 20B and 20C, and the power storage apparatuses 20C and 20D are connected in series by the respective communication lines 40. Thus, the power storage apparatuses 20A to 20D are connected in sequence by the communication lines 40 in such a manner that the power storage apparatuses 20A and 20D located at the end portions of the common communication line 30 are located at either end. In the present embodiment, it is assumed that the terminating resistor 27 of the power storage apparatus 20A is preliminarily connected to the common communication line 30 by a user operation or the like. It is also assumed that the ID of the power storage apparatus 20A is preliminarily set to be 1. In FIG. 3, the left side and the right side will be respectively referred to as upstream and downstream, for the purpose of illustration. For example, the power storage apparatus 20A is arranged upstream of the power storage apparatus 20B. Also, for example, the power storage apparatus 20B is arranged downstream of the power storage apparatus 20A.

In FIG. 3, the processing starts when, for example, the power of the power storage apparatuses 20A, 20B, 20C, and 20D included in the power supply system 1 are turned on. Each of the power storage apparatuses 20A to 20D transmits a presence signal indicating its presence to a power storage apparatus located upstream thereof. Also, each of the power storage apparatuses 20A to 20D receives a presence signal indicating the presence of a power storage apparatus located downstream of the power storage apparatus. For example, the power storage apparatus 20B transmits the presence signal thereof to the power storage apparatus 20A and receives the presence signal of the power storage apparatus 20C from the power storage apparatus 20C. When the power storage apparatus 20 does not receive a presence signal of a power storage apparatus located downstream thereof, the power storage apparatus 20 determines that the power storage apparatus 20 is connected to an end portion of the common communication line 30 and connects its terminating resistor 27 to the common communication line 30. In the present example, the power storage apparatus 20D does not have a power storage apparatus located downstream thereof and thus does not receive a presence signal of a power storage apparatus located downstream thereof. Thus, the power storage apparatus 20D connects its terminating resistor 27 to the common communication line 30. In this way, the terminating resistors 27 of the power storage apparatuses 20A and 20D are connected to the common communication line 30, and the terminating resistors 27 of the power storage apparatuses 20B and 20C are disconnected from the common communication line 30.

Each of the power storage apparatuses 20A, 20B, 20C, and 20D included in the power supply system 1 receives an ID signal that includes an ID of a power storage apparatus located upstream thereof. The power storage apparatus 20 sets an ID thereof, based on an ID of the power storage apparatus located upstream thereof. When an ID is set, the power storage apparatus 20 transmits an ID signal that includes the ID thereof to a power storage apparatus located downstream thereof. In the power supply system 1, because the ID of the power storage apparatus 20A is preliminarily set to be 1, the power storage apparatus 20B receives an ID signal that includes 1 as the ID of the power storage apparatus 20A. Based on this information, the power storage apparatus 20B performs processing to, for example, add 1 to the value of the received ID and sets the ID of the power storage apparatus 20B to be 2. Then, the power storage apparatus 20B transmits an ID signal that includes 2 as the ID of the power storage apparatus 20B to the power storage apparatus 20C. In this way, the IDs of the power storage apparatuses 20B, 20C and 20D are respectively set to be 2, 3, and 4.

After the above processing, the power storage apparatus 20 connected to the common communication line 30 starts communication with another power storage apparatus via the common communication line 30. For example, the power storage apparatuses 20B, 20C, and 20D transmit respective instructions to notify the ID of the power storage apparatus 20A and the information regarding connection/disconnection of the terminating resistor 27 to the power storage apparatus 20A. Based on the instructions, the power storage apparatus 20A may create a configuration diagram of the power supply system as illustrated in FIG. 3 and display the configuration diagram on the display device or the like of the power storage apparatus 20A. Also, the power storage apparatuses 20B, 20C, and 20D transmit the respective IDs and respective information regarding at least one of a charged capacity, a deterioration level, and a failure statuses to the power storage apparatus 20A. Based on the information, the power storage apparatus 20A may formulate a plan for controlling and managing the power storage apparatuses included in the power supply system 1 and transmit a control signal to each of the power storage apparatuses. The power storage apparatus 20 may transmit the ID of the power storage apparatus 20, information regarding a remaining level of electric power stored in the power storage apparatus 20, and the information regarding connection/disconnection of its terminating resistor 27 to the power storage apparatus 20A.

Example Operation 1 of Power Supply Apparatus

An example operation performed by the power storage apparatus 20 as an example of the power supply apparatus according to an embodiment of the present disclosure will be described with reference to FIG. 4. Although the operation performed by one of the power storage apparatuses 20A, 20B, 20C, and 20D illustrated in FIG. 3 will be described, other power storage apparatuses perform in a similar manner.

Step S101: The controller 21 transmits, via the communication line 40, a signal indicating the presence of the power storage apparatus 20 of the controller 21 to the first apparatus connected to the power storage apparatus 20, among other apparatuses connected to the common communication line 30. The first apparatus may be an apparatus located upstream of the power storage apparatus 20.

Step S102: The controller 21 attempts to receive a signal indicating the presence of the second apparatus from the second device connected to the power storage apparatus 20, among other apparatuses, via the communication line 40. The second apparatus may be an apparatus located downstream of the power storage apparatus 20.

Step S103: When the communication interface 23 receives the signal indicating the presence of the second apparatus (Yes in step S102), the controller 21 determines that the power storage apparatus 20 is not connected to an end portion of the common communication line 30 and leaves the terminating resistor 27 of the power storage apparatus 20 disconnected.

Step S104: When the communication interface 23 does not receive the signal indicating the presence of the second apparatus (No in step S102), the controller 21 determines that the power storage apparatus 20 of the controller 21 is connected to an end portion of the common communication line 30 and connects the terminating resistor 27 of the power storage apparatus 20 to the common communication line 30.

Step S105: The controller 21 determines whether the power storage apparatus 20 of the controller 21 is provided with an ID. When the controller 21 determines that the power storage apparatus 20 of the controller 21 is provided with an ID (Yes in step S105), the controller 21 performs the procedure of step S108.

Step S106: When the controller 21 determines that the power storage apparatus 20 of the controller 21 is not provided with an ID (No in step S105), the controller 21 receives a signal including the ID of the first apparatus from the first apparatus via the communication line 40.

Step S107: The controller 21 sets the ID of the power storage apparatus 20, based on the ID of the first apparatus.

Step S108: The controller 21 causes the communication interface 23 to transmit a signal including the ID of the power storage apparatus 20 of the controller 21 to the second apparatus via the communication line 40.

Step S109: The controller 21 starts communication with another apparatus connected to the common communication line 30 via the common communication line 30.

Step S110: The controller 21 transmits, to another apparatus connected to the common communication line 30, an instruction to notify at least one of information whether the power storage apparatus 20 is connected to an end portion of the common communication line 30 and an ID of the power storage apparatus 20, via the common communication line 30.

Example Operation 2 of Power Supply System

Figure 5:
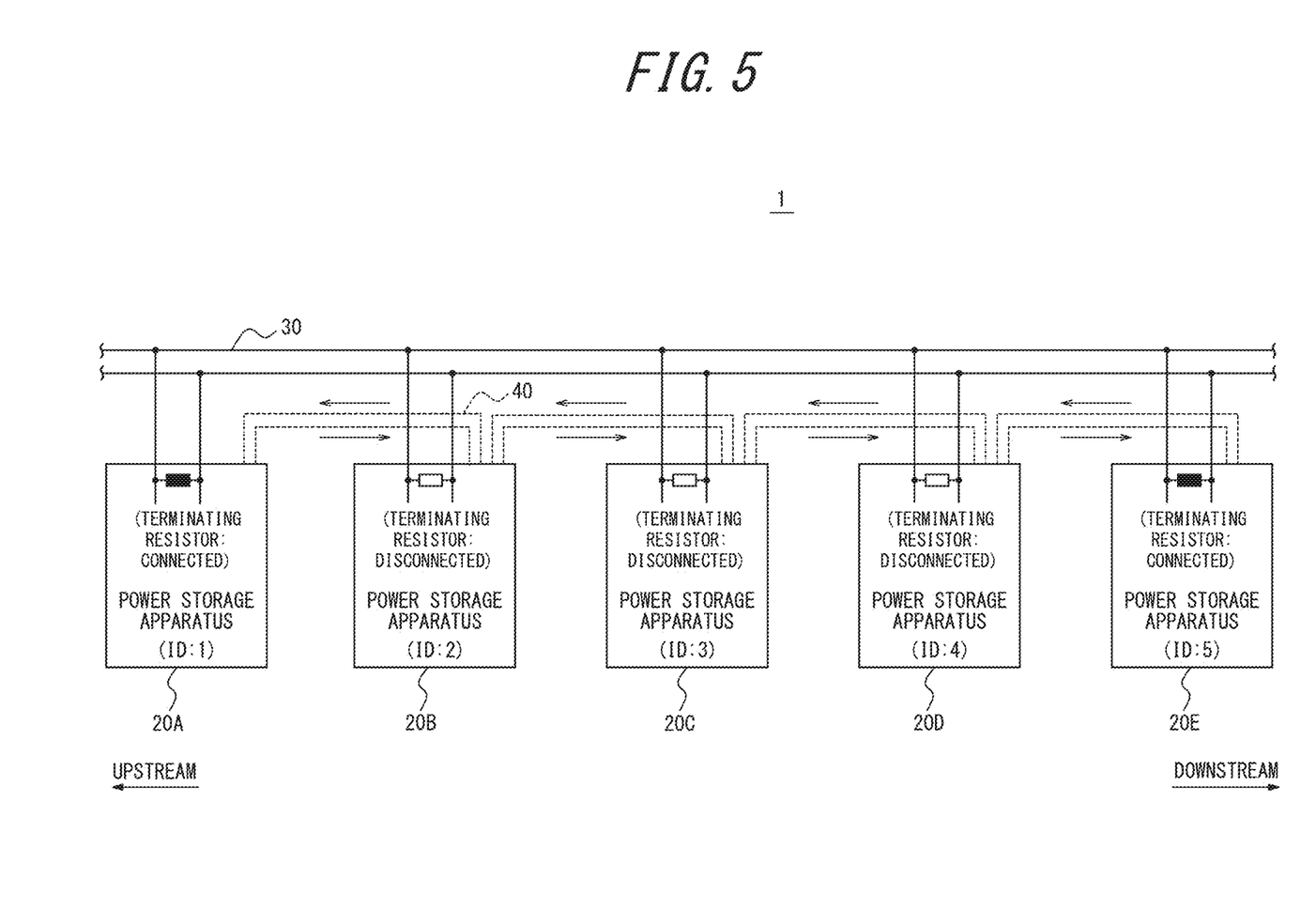
FIG. 5 is a diagram illustrating an example in which a power supply apparatus is added to the power supply system illustrated in FIG. 3.

Another example processing to connect a terminating resistor and providing an ID performed by the power supply system 1 according to an embodiment of the present disclosure will be described with reference to FIG. 3 and FIG. 5 to FIG. 7. The power supply system 1 according to the example operation 2 may have a configuration similar to that of the example operation 1 described above, as illustrated in FIG. 3. According to the present example, however, the terminating resistors 27 of the power storage apparatuses 20A, 20B, 20C, and 20D are not preliminarily connected to the common communication line 30. Also, the IDs of the power storage apparatuses 20A, 20B, 20C, and 20D are not preliminarily provided. In FIG. 5, the left side and the right side will be respectively referred to as upstream and downstream, for the purpose of illustration. For example, the power storage apparatus 20A is provided upstream of the power storage apparatus 20B.

In FIG. 3, the processing starts when, for example, the power of the power storage apparatuses 20A, 20B, 20C, and 20D included in the power supply system 1 is turned on. Each of the power storage apparatuses transmits the presence signal indicating its presence to another power storage apparatus located upstream thereof. Also, each of the power storage apparatuses receives the presence signal of a power storage apparatus located downstream thereof via the communication line 40. For example, the power storage apparatus 20B transmits the presence signal of the power storage apparatus 20B to the power storage apparatus 20A and receives the presence signal of the power storage apparatus 20C from the power storage apparatus 20C. When the power storage apparatus 20 does not receive a presence signal of a power storage apparatus located downstream thereof, the power storage apparatus 20 determines that the power storage apparatus 20 is connected to an end portion of the common communication line 30 and connects the terminating resistor 27 of the power storage apparatus 20 to the common communication line 30. In the present example, because the power storage apparatus 20D does not have a power storage apparatus that is connected downstream thereof, the power storage apparatus 20D does not receive a presence signal from a power storage apparatus located downstream thereof. Thus, the power storage apparatus 20D connects its terminating resistor 27 to the common communication line 30.

Next, each of the power storage apparatuses 20 transmits the presence signal thereof to the power storage apparatus located downstream thereof via the communication line 40. Also, each of the power storage apparatuses 20 receives the presence signal of the power storage apparatus located upstream of the power storage apparatuses via the communication line 40. For example, the power storage apparatus 20B transmits the presence signal of the power storage apparatus 20B to the power storage apparatus 20C and receives the presence signal of the power storage apparatus 20A from the power storage apparatus 20A. When the power storage apparatus 20 does not receive a presence signal of a power storage apparatus located upstream thereof, the power storage apparatus 20 determines that the power storage apparatus 20 is connected to an end portion of the common communication line 30 and connects its terminating resistor 27 to the common communication line 30. In the present example, because a power storage apparatus 20A does not have a power storage apparatus located upstream thereof, the power storage apparatus 20A does not receive a presence signal from a power storage apparatus located upstream thereof. Thus, the power storage apparatus 20A connects its terminating resistor 27 to the common communication line 30. In this way, the terminating resistors 27 of the power storage apparatuses 20A and 20D are connected to the common communication line 30, and the terminating resistors 27 of the power storage apparatuses 20B and 20C are disconnected from the common communication line 30. Further, in a case in which one of the power storage apparatuses does not receive a signal indicating the presence of a power storage apparatus located upstream thereof, the power storage apparatus sets its ID to a predetermined value, 1. In this way, the ID of the power storage apparatus 20A is set to be 1.

Each of the power storage apparatuses 20A, 20B, 20C, and 20D included in the power supply system 1 receives an ID signal including an ID of a power storage apparatus from the power storage apparatus located upstream thereof. Each of the power storage apparatus 20 sets an ID thereof, based on the ID of the power storage apparatus located upstream thereof. When an ID of each of the power storage apparatuses 20 is set, each of the power storage apparatuses 20 transmits a signal including the ID thereof to a power storage apparatus located downstream thereof. In the power supply system 1, because the ID of the power storage apparatus 20A is set to be 1, the respective IDs of the power storage apparatuses 20B, 20C, and 20D are set to be 2, 3, and 4 in the present processing. After this processing, the power storage apparatuses 20 connected to the common communication line 30 start communication with another power storage apparatus via the common communication line 30.

The power supply system 1 according to the present embodiment can increase or reduce the power storage capacity by adding or removing a power storage apparatus. For example, FIG. 5 illustrates the power supply system 1 in which a power storage apparatus 20E is added to the power supply system 1 illustrated in FIG. 3. In the power supply system 1 illustrated in FIG. 3, it is assumed that the terminating resistors 27 of the power storage apparatuses 20A and 20D are connected to the common communication line 30, and the IDs of the power storage apparatuses 20A, 20B, 20C, and 20D are respectively set to be 1, 2, 3, and 4 in the above processing. Then, the user turns off the power of the power supply system 1 to add the power storage apparatus 20E. When the power is turned off, the IDs set to the power storage apparatuses 20A to 20D are cleared. In a state in which the power supply system 1 is turned off by the user, the power storage apparatus 20E is connected to the common communication line 30, and to the power storage apparatus 20E via the communication line 40. In this state, the power of the power storage apparatuses 20A, 20B, 20C, 20D, and 20E included in the power supply system 1 is turned back on. Then, the processing similar to that described above is performed, whereby the terminating resistors 27 of the power storage apparatuses 20A and 20E are connected to the common communication line 30, and the terminating resistors 27 of the power storage apparatuses 20B, 20C, and 20D are disconnected from the common communication line 30. Also, the IDs of the power storage apparatuses 20A, 20B, 20C, 20D, and 20E are respectively set to be 1, 2, 3, 3, and 5. After this processing, the power storage apparatuses 20 connected to the common communication line 30 can start communication with another power storage apparatus via the common communication line 30.

Figure 6:
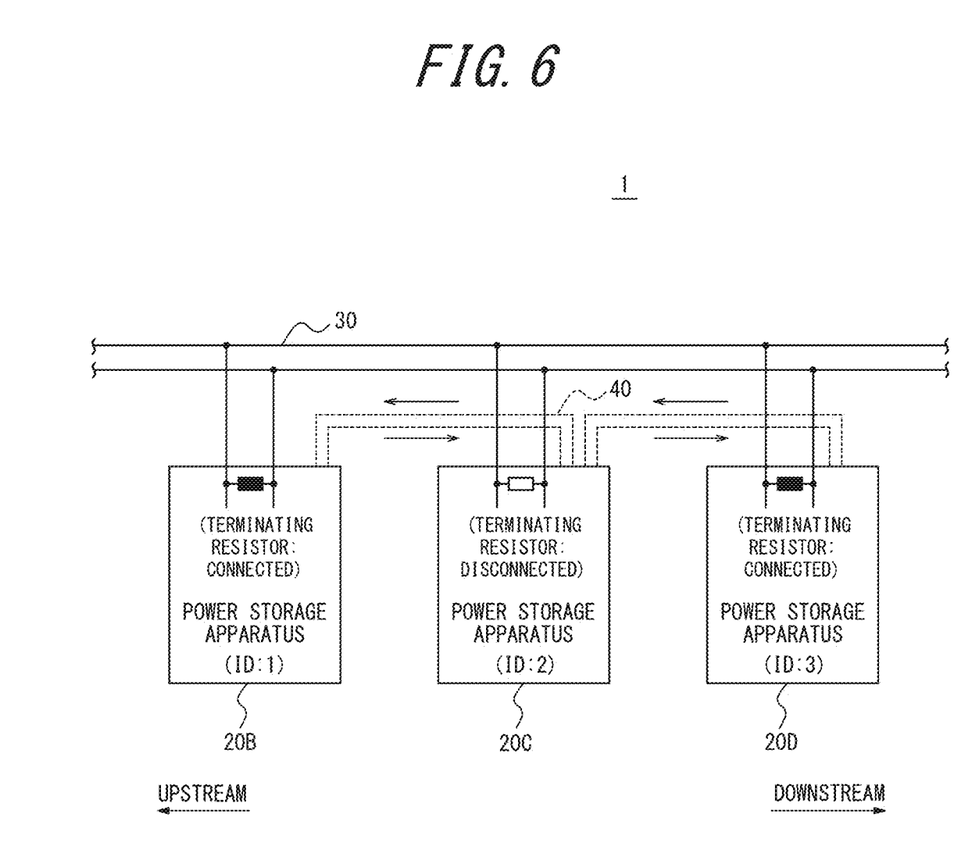
FIG. 6 is a diagram illustrating an example in which a power supply apparatus is removed from the power supply system illustrated in FIG. 3.

FIG. 6 illustrates a power supply system 1 in which the power storage apparatus 20A is removed the power supply system 1 illustrated in FIG. 3. In the power supply system 1 illustrated in FIG. 3, it is assumed that the terminating resistors 27 of the power storage apparatuses 20A and 20D are connected to the common communication line 30, and the IDs of the power storage apparatuses 20A, 20B, 20C, and 20D are respectively set to be 1, 2, 3, and 4 in the above processing. Then, the power of the power supply system 1 is turned off by the user to remove the power storage apparatus 20A. When the power is turned off, the IDs set to the power storage apparatuses 20A to 20D are cleared. The power storage apparatus 20A is removed from the common communication line 30 by the user, and from the power storage apparatus 20B via the communication line 40. In this state, the power of the power storage apparatuses 20B, 20C, and 20D included in the power supply system 1 is turned back on. The processing similar to that described above is performed, whereby the terminating resistors 27 of the power storage apparatuses 20B and 20D are connected to the common communication line 30, and the terminating resistor 27 of the power storage apparatus 20C is disconnected from the common communication line 30. Also, the IDs of the power storage apparatuses 20B, 20C, and 20D are respectively set to be 1, 2, and 3. After this processing, the power storage apparatuses 20 connected to the common communication line 30 can start communication with another power storage apparatus via the common communication line 30.

Example Operation 2 of Power Supply Apparatus

Figure 7:
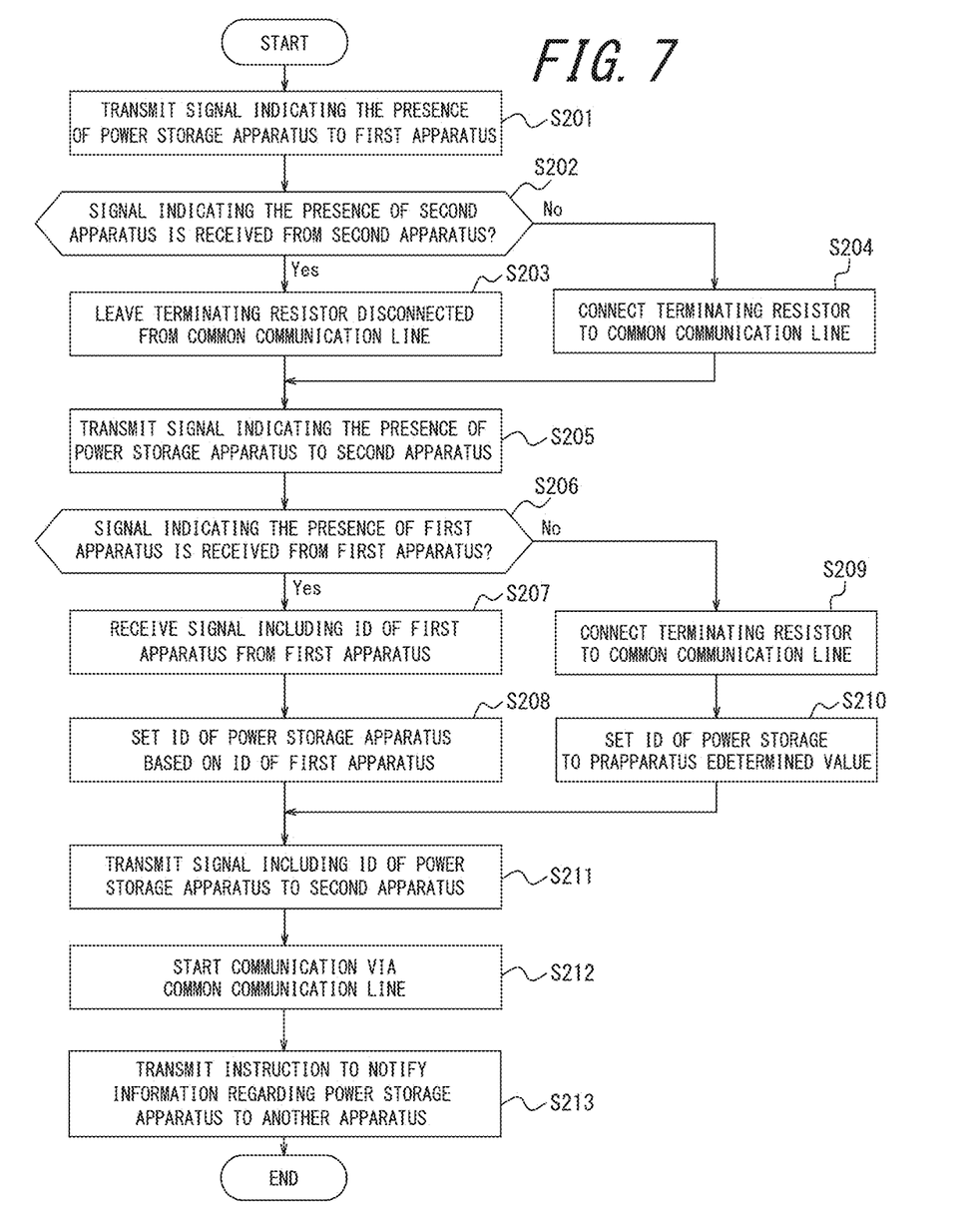
FIG. 7 is a flowchart illustrating another example of the processing performed by the power supply apparatus illustrated in FIG. 3.

Another example processing performed by the power storage apparatus 20 as an example of the power storage apparatus according to one embodiment of the present disclosure will be described with reference to FIG. 7. Although the processing performed by one of the power storage apparatuses illustrated in FIG. 3, FIG. 5, and FIG. 6 will be described, similar processing is performed by other power storage apparatuses.

Step S201: The controller 21 transmits a signal indicating the presence of the power storage apparatus 20 of the controller 21 to the first apparatus connected to the power storage apparatus 20 among other apparatuses connected to the common communication line 30, via the communication line 40.

Step S202: The controller 21 attempts to receive a signal indicating the presence of the second apparatus from the second apparatus connected to the power storage apparatus 20, among other apparatuses, via the communication line 40.

Step S203: In a case in which the communication interface 23 receives the signal indicating the presence of the second apparatus (Yes in step S202), the controller 21 determines that the power storage apparatus 20 is not connected to an end portion of the common communication line 30 and leaves the terminating resistor 27 of the power storage apparatus 20 disconnected from the common communication line 30.

Step S204: In a case in which the communication interface 23 does not receive the signal indicating the presence of the second apparatus (No in step S202), the controller 21 determines that the power storage apparatus 20 is connected to an end portion of the common communication line 30 and connects the terminating resistor 27 of the power storage apparatus 20 to the common communication line 30.

Step S205: The controller 21 transmits the signal indicating the presence of the power storage apparatus 20 to the second apparatus connected to the power storage apparatus 20, among other apparatuses connected to the common communication line 30.

Step S206: The controller 21 attempts to receive the signal indicating the presence of the first apparatus from the first apparatus connected to the power storage apparatus 20, among other apparatuses.

Step S207: In a case in which the communication interface 23 receives the signal indicating the presence of the first apparatus (Yes in step S206), the controller 21 causes the communication interface 23 to receive the signal indicating the ID of the first apparatus from the first apparatus.

Step S208: The controller 21 sets the ID of the power storage apparatus 20, based on the ID of the first apparatus.

Step S209: In a case in which the communication interface 23 does not receive the signal indicating the presence of the first apparatus (No in step S206), the controller 21 determines that the power storage apparatus 20 is connected to an end portion of the common communication line 30 and connects the terminating resistor 27 of the power storage apparatus 20 to the common communication line 30.

Step S210: The controller 21 sets the ID of the power storage apparatus 20 to be the predetermined value.

Step S211: The controller 21 causes the communication interface 23 to transmit the signal including the ID of the power storage apparatus 20 to the second apparatus.

Step S212: The controller 21 starts communication with another apparatus connected to the common communication line 30 via the common communication line 30.

Step S213: The controller 21 transmits, via the common communication line 30, an instruction to notify at least one of information whether the power storage apparatus 20 is connected to an end portion of the common communication line 30 and the ID of the power storage apparatus 20 to other apparatuses connected to the common communication line 30.

According to the present embodiment, as described above, the power supply apparatus can be connected to the common communication line 30 together with at least one another apparatus. The power supply apparatus includes the communication interface 23 and the controller 21. The controller 21 is configured to transmit the signal indicating the presence of the power supply apparatus to the first apparatus connected to the power supply apparatus among other apparatuses, and to receive the signal indicating the presence of the second apparatus from the second apparatus connected to the power supply apparatus, among other apparatuses. The controller 21 is configured to determine whether the power supply apparatus is connected to an end portion of the common communication line 30, based on whether the communication interface 23 has received the signal indicating the presence of the second apparatus. In particular, the controller 21 is configured to determine that the power supply apparatus is connected to an end portion of the common communication line 30 in a case in which the communication interface 23 does not receive the signal indicating the presence of the second apparatus. As described above, the power supply apparatus connected to the common communication line 30 can determine whether the power supply apparatus is connected to an end portion of the common communication line 30, at the preparation stage preparing for the use of the common communication line 30. This improves the usability of the technique for controlling a plurality of power supply apparatuses that are connected to the common communication line.

According to the present embodiment, the power supply apparatus further includes the terminating resistor 27 that can be connected to the common communication line 30. The controller 21 is configured to connect the terminating resistor 27 to the common communication line 30 when the controller 21 determines that the power supply apparatus is connected to an end portion of the common communication line 30. Thus, the terminating resistor 27 can be connected to the common communication line 30, eliminating the necessity to, for example, connect the terminating resistor 27 by hand, or to connect or disconnect the terminating resistor 27 by hand. This improves the usability of the technique for controlling a plurality of power supply apparatuses that are connected to the common communication line.

According to the present embodiment, the communication interface 23 is configured to receive the signal indicating the ID of the first apparatus from the first apparatus and to transmit the signal indicating the ID of the power supply apparatus to the second apparatus. The controller 21 is configured to set the ID of the power supply apparatus, based on the ID of the first apparatus. Thus, the IDs of the power supply apparatuses connected to the common communication line 30 can be uniquely set without overlapping with each other, whereby the usability of the technique for controlling a plurality of power supply apparatuses that are connected to the common communication line is improved.

According to the present embodiment, the communication interface 23 is configured to transmit the signal indicating the presence of the power supply apparatus to the second apparatus and to receive the signal indicating the presence of the first apparatus from the first apparatus. The controller 21 is configured to set the ID of the power supply apparatus to the predetermined value in a case in which the communication interface 23 does not receive the signal indicating the presence of the first apparatus. Thus, an ID of the power supply apparatuses connected to the common communication line 30 can be set, without the necessity to preliminarily set an ID of one of the power supply apparatuses.

According to the present embodiment, other apparatuses include a power supply apparatus or a power control apparatus 10. Thus, the power supply system 1 can have a flexible configuration of the apparatuses, whereby the usability of the technique for controlling a plurality of power supply apparatuses that are connected to the common communication line is improved.

According to the present embodiment, the controller 21 is configured to transmit, via the common communication line 30, the instruction to notify at least one of the information whether the power supply apparatus is connected to an end portion of the common communication line 30 and an ID of the power supply apparatus to another apparatus. Thus, the information regarding the power supply apparatus connected to the common communication line 30 can be provided to the user by any one of the apparatuses, whereby the usability of the technique for controlling a plurality of power supply apparatuses that are connected to the common communication line is improved.

According to the present embodiment, the communication interface 23 includes an input terminal and an output terminal. The controller 21 is configured to attempt to receive signals from the input terminal and the output terminal when the communication interface 23 starts communication. Thus, failure of the terminals or the like due to cable mis-wiring or the like can be suppressed upon reception of a signal from the communication line 40B connected to the output terminal.

According to the present embodiment, the control apparatus is configured to control the power supply apparatus that can be connected to the common communication line 30 together with at least one other apparatus. The control apparatus is configured to cause the power supply apparatus to transmit a signal indicating the presence of the power supply apparatus to the first apparatus connected to the power supply apparatus, among other apparatuses. The control apparatus is configured to cause the power supply apparatus to receive a signal indicating the presence of the second apparatus from the second apparatus connected to the power supply apparatus, among other apparatuses. The control apparatus is configured to determine whether the power supply apparatus is connected to an end portion of the common communication line 30, based on whether the power supply apparatus has received the signal indicating the presence of the second apparatus. As described above, the control apparatus such as a battery management system or a home energy management system for controlling the power supply apparatus is configured to be able to determine whether the power supply apparatus connected to the common communication line 30 is connected to an end portion of the common communication line 30. The control apparatus may be incorporated in the power supply apparatus or separately provided as an individual apparatus external to the power supply apparatus. Thus, the usability of the technique for controlling a plurality of power supply apparatuses that are connected to the common communication line is improved.

Although the above embodiments have been described as typical examples, it should be appreciated that those who are skilled in the art can easily perform variations or alterations within the spirit and scope of the present disclosure. Accordingly, the present disclosure should not be construed as being limited to the embodiments described above and can be variously modified or changed without departing from the scope of the claims. For example, the function included in each of the means or steps may be rearranged avoiding a logical inconsistency, such that a plurality of means or steps are combined or subdivided.

For example, although in the above embodiment the power supply apparatuses have been described as power storage apparatuses, this is not restrictive. The power supply apparatuses may be, for example, solar cells, wind power generators, fuel cells, or the like.

The invention claimed is:

1. A power supply apparatus connectable to a common communication line together with at least one other apparatus, the power supply apparatus comprising:
   a communication interface configured
      to transmit, via a first communication line different from the common communication line, a signal indicating a presence of the power supply apparatus to a first apparatus connected to the power supply apparatus, among the at least one other apparatus, and
      to receive, via a second communication line different from the common communication line, a signal indicating a presence of a second apparatus from the second apparatus connected to the power supply apparatus, among the at least one other apparatus; and
   a controller configured to determine whether the power supply apparatus is connected to an end portion of the common communication line, based on whether the communication interface has received the signal indicating the presence of the second apparatus,
   wherein the controller is configured to transmit, via the common communication line, an instruction to notify information regarding whether the power supply apparatus is connected to the end portion of the common communication line.

2. The power supply apparatus according to claim 1, wherein the controller is configured to determine that the power supply apparatus is connected to the end portion of the common communication line, in a case in which the communication interface does not receive the signal indicating the presence of the second apparatus.

3. The power supply apparatus according to claim 1, further comprising a terminating resistor connectable to the common communication line,
   wherein the controller is configured to connect the terminating resistor to the common communication line, in a case in which the power supply apparatus is determined to be connected to the end portion of the common communication line.

4. The power supply apparatus according to claim 1, wherein the at least one other apparatus includes a further power supply apparatus or a power control apparatus.

5. The power supply apparatus according to claim 1, wherein the communication interface includes an input terminal and an output terminal, and
   the controller is configured to attempt to receive a signal from each of the input terminal and the output terminal when the communication interface starts communication.

6. The power supply apparatus according to claim 1, wherein the communication interface is configured to receive a signal including an ID of the first apparatus from the first apparatus, and to transmit a signal including an ID of the power supply apparatus to the second apparatus, and
   the controller is configured to set the ID of the power supply apparatus, based on the ID of the first apparatus.

7. The power supply apparatus according to claim 6, wherein the communication interface is configured to transmit a signal indicating the presence of the power supply apparatus to the second apparatus, and to receive a signal indicating the presence of the first apparatus from the first apparatus, and the controller is configured to set the ID of the power supply apparatus to be a predetermined value, in a case in which the communication interface does not receive the signal indicating the presence of the first apparatus.

8. The power supply apparatus according to claim 6, wherein the controller is configured to transmit, via the common communication line, an instruction to notify the ID of the power supply apparatus to the at least one other apparatus.

9. A control apparatus configured to control a power supply apparatus connectable to a common communication line together with at least one other apparatus, the control apparatus is configured to:
  cause the power supply apparatus to transmit, via a first communication line different from the common communication line, a signal indicating a presence of the power supply apparatus to a first apparatus connected to the power supply apparatus, among the at least one other apparatus;
  cause the power supply apparatus to receive, via a second communication line different from the common communication line, a signal indicating a presence of a second apparatus from the second apparatus connected to the power supply apparatus, among the at least one other apparatus;
  determine whether the power supply apparatus is connected to an end portion of the common communication line, based on whether the power supply apparatus has received the signal indicating the presence of the second apparatus; and
  cause the power supply apparatus to transmit, via the common communication line, an instruction to notify information regarding whether the power supply apparatus is connected to the end portion of the common communication line.

10. A method of controlling a power supply apparatus connectable to a common communication line together with at least one other apparatus, the method comprising:
  transmitting, via a first communication line different from the common communication line, a signal indicating a presence of the power supply apparatus to a first apparatus connected to the power supply apparatus, among the at least one other apparatus;
  receiving, via a second communication line different from the common communication line, a signal indicating a presence of a second apparatus from the second apparatus connected to the power supply apparatus, among the at least one other apparatus;
  determining whether the power supply apparatus is connected to an end portion of the common communication line, based on whether the signal indicating the presence of the second apparatus has been received; and
  transmitting, via the common communication line, an instruction to notify information regarding whether the power supply apparatus is connected to the end portion of the common communication line.

11. A power supply apparatus connectable to a common communication line together with at least one other apparatus, the power supply apparatus comprising:
  a communication interface configured
    to transmit a signal indicating a presence of the power supply apparatus to a first apparatus connected to the power supply apparatus, among the at least one other apparatus, and
    to receive a signal indicating a presence of a second apparatus from the second apparatus connected to the power supply apparatus, among the at least one other apparatus;
  a controller configured to determine whether the power supply apparatus is connected to an end portion of the common communication line, based on whether the communication interface has received the signal indicating the presence of the second apparatus; and
  a terminating resistor connectable to the common communication line,
  wherein the controller is configured to connect the terminating resistor to the common communication line, in a case in which the power supply apparatus is determined to be connected to the end portion of the common communication line.

* * * * *